United States Patent [19]
Spitz

[11] Patent Number: 5,375,176
[45] Date of Patent: Dec. 20, 1994

[54] METHOD AND APPARATUS FOR AUTOMATIC CHARACTER TYPE CLASSIFICATION OF EUROPEAN SCRIPT DOCUMENTS

[75] Inventor: A. Lawrence Spitz, Palo Alto, Calif.

[73] Assignees: Xerox Corporation, Stamford, Conn.; Fuji Xerox Corporation, Tokyo, Japan

[21] Appl. No.: 47,540

[22] Filed: Apr. 19, 1993

[51] Int. Cl.$^5$ .............................................. G06K 9/62
[52] U.S. Cl. ........................................ 382/39; 382/17; 382/19
[58] Field of Search ................ 382/13, 30, 34, 36, 382/38, 39, 48, 17, 10, 61, 19; 369/419.01, 419.02, 419.03, 419.04

[56] References Cited

U.S. PATENT DOCUMENTS

| | | | |
|---|---|---|---|
| 4,516,262 | 5/1985 | Sakurai | 382/36 |
| 4,903,311 | 2/1990 | Nakamura | 382/48 |
| 5,131,053 | 7/1992 | Bernzott et al. | 382/22 |

Primary Examiner—Joseph Mancuso
Attorney, Agent, or Firm—Oliff & Berridge

[57] ABSTRACT

An automatic abstract character coding system automatically generates abstract coded characters from the text image of a document when the gross script-type is known to be, or is determined to be, a European type script. A connected component generating means generates connected components from the pixels comprising the text image. A spatial feature determining means generates a character cell surrounding one or more aligned connected component. A character-type classifying means converts the character cell to one of a plurality of abstract character codes.

12 Claims, 8 Drawing Sheets

| Character shape code | Members |
|---|---|
| A | ABCDEFGHIJKLMNOPQRSTUVWXYZbdfhklt&1234567890#$&()/<>[]@{}! |
| x | acemnorsuvwxz |
| i | iáâãäéêëíîïóûü |
| g | gpqyç |
| j | j |
| ' | ' |
| ı | ~ |
| ' | ' |
| .. | .. |
| = | = |
| U | äëöüÖÜ |
| ¡ | ¡ |

FIG.5

METHOD AND APPARATUS FOR AUTOMATIC CHARACTER TYPE CLASSIFICATION OF EUROPEAN SCRIPT DOCUMENTS

BACKGROUND OF THE INVENTION

1. Field of the Invention

The present invention relates to a method and apparatus for automatic document recognition and, more particularly, to a method for automatically converting character cells of a document to abstract character codes and word tokens.

2. Description of Related Art

Optical character recognition and the use of optical character recognition to convert scanned image data into text data suitable for use in a digital computer is well known. In addition, methods for converting scanned image data into text data and the types of errors such methods generate are well known. However, the selection of a proper method for error correction is highly dependent upon the language of the document. Conventionally, the methods for optical character recognition and for error correction in optical character recognition systems have been provided on the assumption that the language used in the document is known in advance. An optical character recognition system can be implemented with the character recognition and error resolution methods for a plurality of languages.

However, it has heretofore not been possible to have the optical character recognition system automatically determine the language of the document. Rather, as each document is provided to the optical character recognition system, some indication of the particular language of the document must be provided to the optical character recognition system. This has been accomplished by either having the operator input data concerning the language and script of the document to the optical character recognition system, or by having the document provided with special markings which indicate the language of the document.

SUMMARY OF THE INVENTION

It is therefore an object of the present invention to provide an optical character recognition system having automated script and language recognition capabilities.

It is also an object of the present invention to determine the character type classification of the characters of a European script-type document.

It is a further object of the present invention to generate word tokens based on the character-type classification.

According to a first embodiment of the method, once the script of a text portion of a document has been determined as being a European script-type, the one or more connected components of the text portion within each character cell are converted from their "actual" character to an abstract character representation of the gross features of the connected component(s) within the character cells. The plurality of character cells having already been grouped into words based on the widths of the spaces between connected components. Once all of the character cells of the text portion are properly coded, the word tokens are output.

If the text portion of the document has not already been converted to a representative digital data signal, the document is scanned, and all non-text information is removed. The resulting text image is then corrected for skew and other scanning artifacts (if necessary). Once the document image has been scanned and cleaned up, the image is converted from a bitmap of pixels having locations and image densities to a plurality of connected components. After generating the connected components, a bounding box is generated for each connected component. If necessary, the particular script-type of the text of the document is determined, based on the determined distribution of the character patterns. After the particular script-type is determined (if necessary), the text portion is vertically and horizontally splayed in order to determine which connected components are part of which lines, to determine the interword and intraword character spacing of each line, and to place the connected components into character cells.

BRIEF DESCRIPTION OF THE DRAWINGS

The invention is described in relation to the accompanying drawings, in which:

FIG. 5 shows the character-type classification code characters and the actual corresponding script characters;

DETAILED DESCRIPTION OF THE PREFERRED EMBODIMENTS

Figure 1:
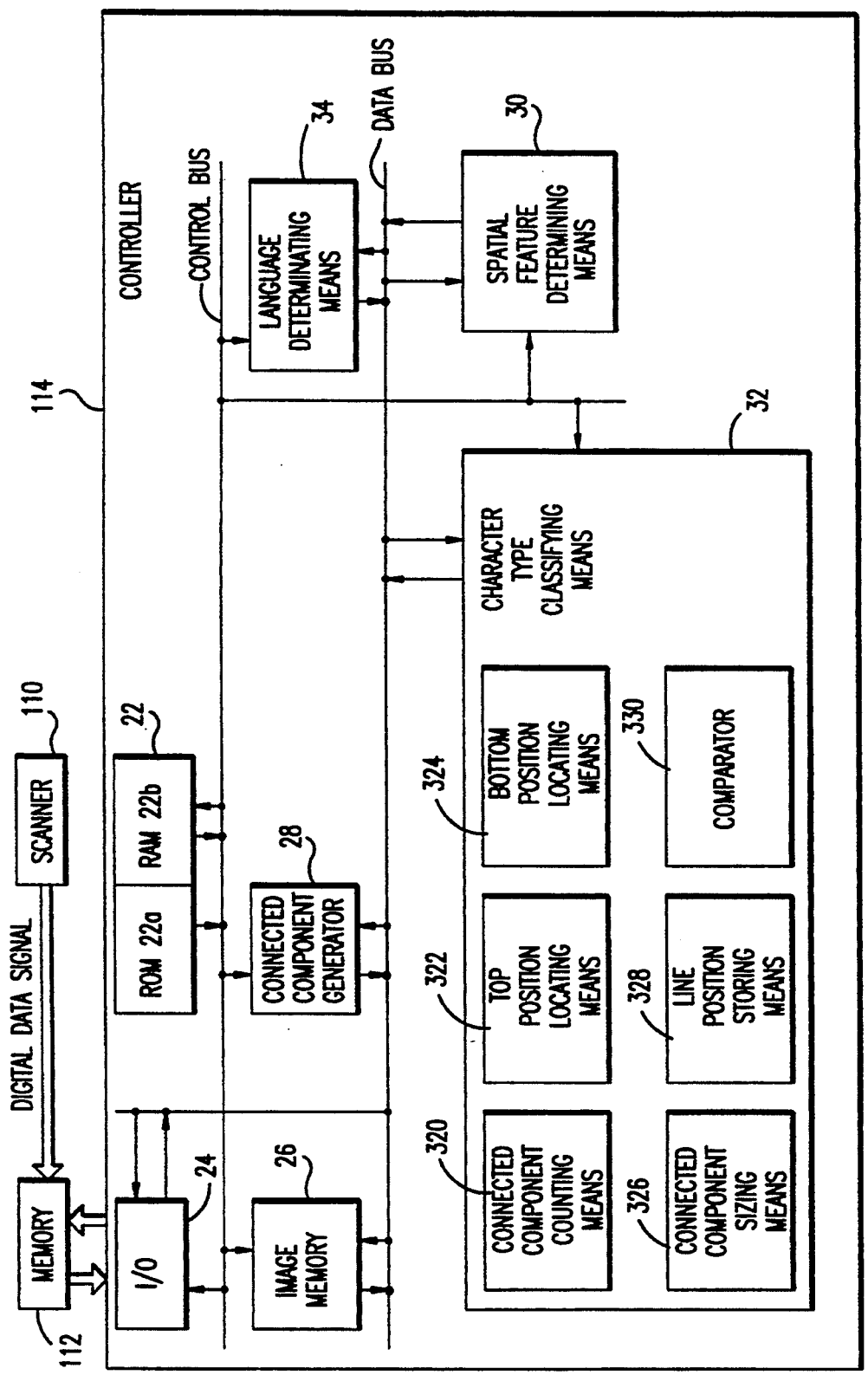
FIG. 1 shows a block diagram of an optical character recognition system.
Figure 2:
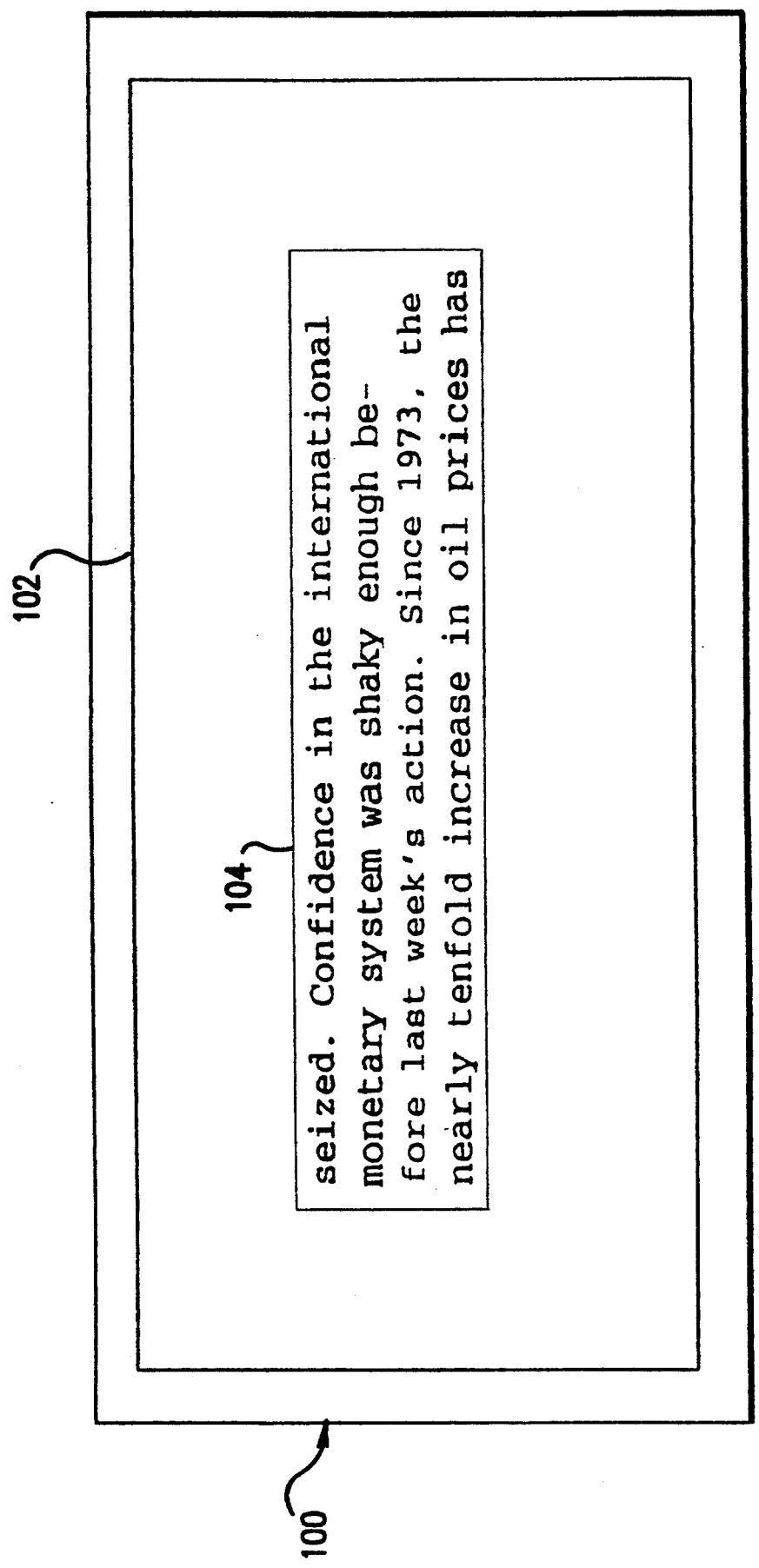
FIG. 2 shows an original document.
Figure 3:
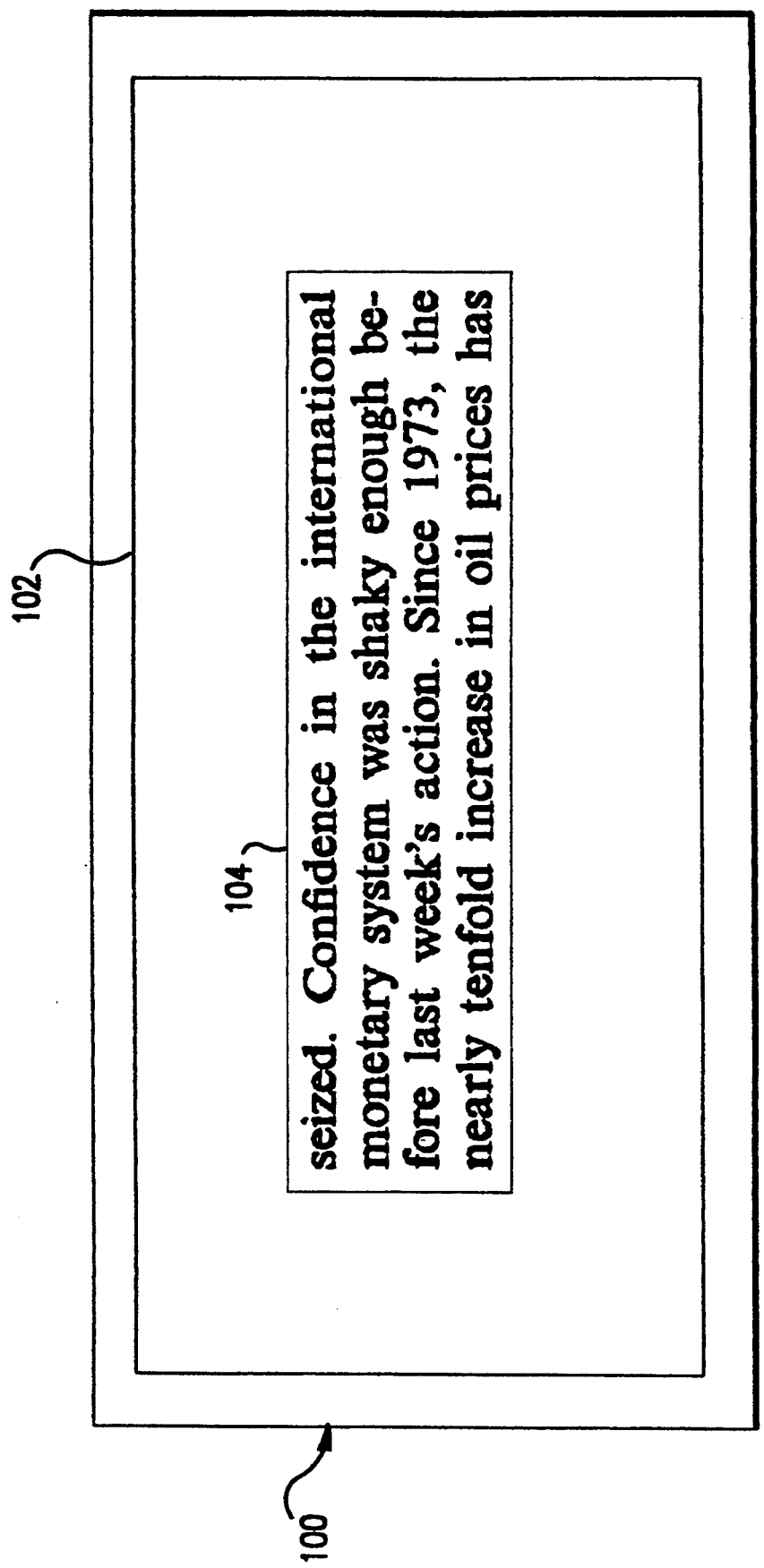
FIG. 3 shows a scanned version of the original document comprising a European script-type text portion.
Figure 4:
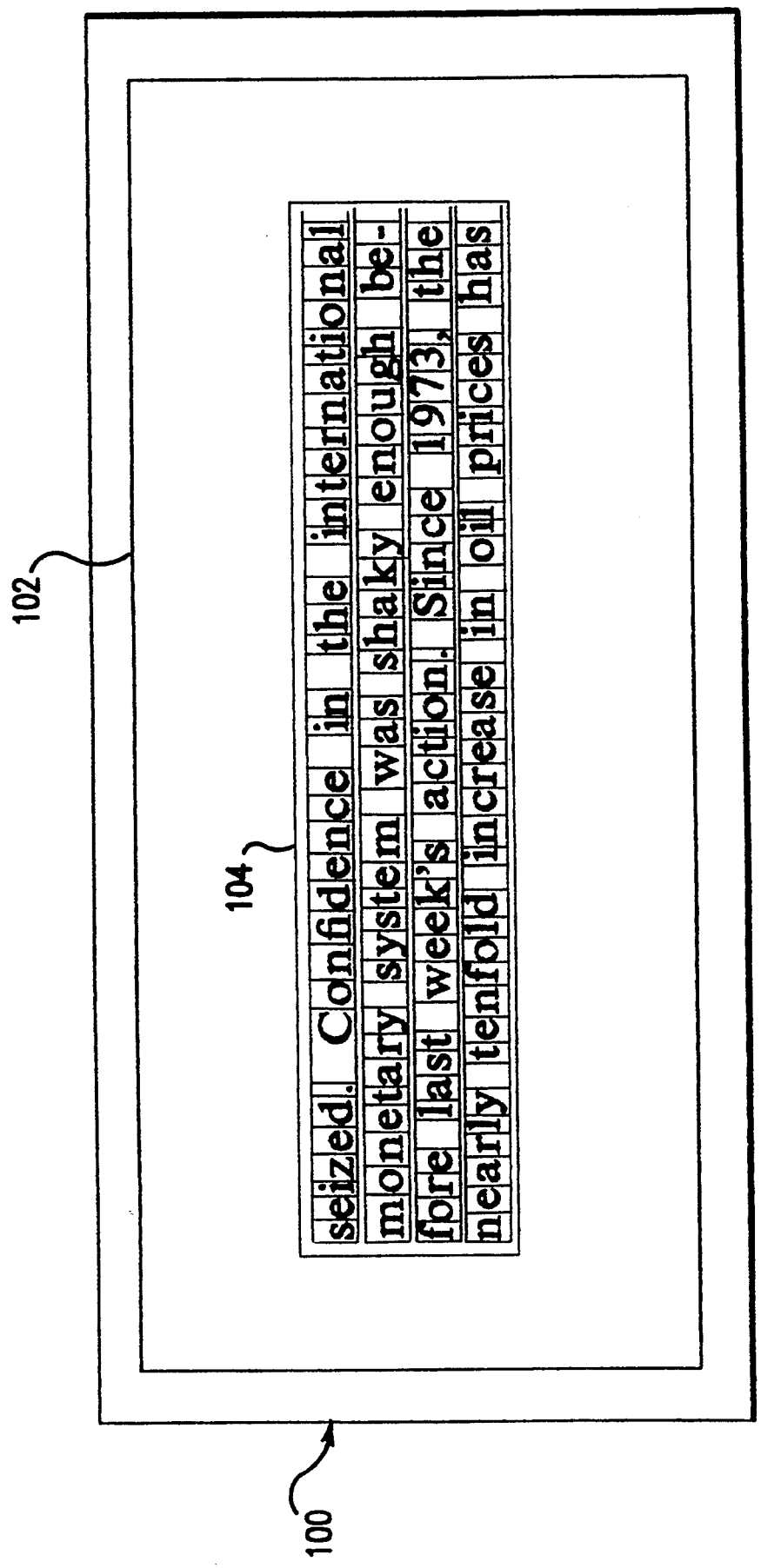
FIG. 4 shows character cells for each set of one or more connected component of the document shown in FIG. 2.

As shown in FIG. 1, a conventional optical character recognition system comprises a scanner 110 having a charge-coupled device (CCD) or the like. The scanner 110 scans a document, such as the one shown in FIG. 2, 100 having an image 102, the image 102 comprising a European script-type text string of unknown language, and outputs a digital data signal representative of the location and image density of a plurality of pixels comprising the image 102 of the original document 100. FIG. 3 shows the scanned version of the document of FIG. 2. This digital data signal is sent to a memory 112, where it is stored temporarily or indefinitely. The digital data signal, when output from the memory 112, is input to a general purpose digital computer 114. Once input to computer 114, the digital data signal is first cleaned up by removing any non-text portions of the image 102, leaving a text portion 104. Further, any scanner artifacts or the digital data signal, such as skew or the like, are corrected for. The cleaned up digital data signal is then restored to the memory 112 or stored in a memory of the computer 114. Alternatively, the scanner can provide some of the preprocessing, such as removal of scanner artifacts.

As shown in FIG. 1, the general purpose digital computer 114 of the present invention comprises a memory 22 for storing a control program, an input/output circuit 24 for inputting the digital data signal from the memory 112 and for outputting a signal representative of the determined word tokens of the text portion 104 of the image 102. The general purpose computer 114 also comprises an image memory 26 for storing the digital data signal, a connected component generating means 28 for generating connected components from the digital data signal; spatial feature determining means 30 for determining the coordinates of lines words and character cells of the text portion 104 and the location for each connected component within each character cell; character-type classifying means 32 for converting the character cell to an abstracted character code; and a language determination means 34 for determining the language of the text portion 104 based on a list of tokens, each token comprising one or more of the coded characters. The memory 22 for storing the control program may comprise either a ROM 22a or a RAM 22b.

In a preferred embodiment of the classification means 32, the classification means 32 includes a connected component counting means 320 for determining the number of connected components within the current character cell, a top position locating means 322 for locating the top position of at least one connected component within the current character cell, a bottom position locating means 324 for locating the bottom position of at least one connected component of the current character cell; a connected component sizing means 326 for determining the height and width of at least one connected component of the current character cell; a line position storing means 328 for storing at least one of the baseline and x-line positions of the line corresponding to the current character cell and comparing means 330 for comparing at least one of a connected component top position, a connected component bottom position, and a connected component height with at least one of a baseline position, a x-line position and a connected component width. Of course, it is understood that each function and corresponding means of the connected component generating means 28, the spatial feature determining means 30, the classification means 32 and the language determining means 34 can be implemented by independent means, and such structure would be equivalent to the preferred embodiments of the present invention as set forth above.

In operation, the document 100 containing the image 102, as shown in FIG. 1, is placed into and scanned by the scanner 110 to generate a serial or parallel data signal. The digital data signal comprises a plurality of signal portions, each portion representative of a corresponding pixel of the original image 102. Each pixel of the image 102 has a location in the image 102 and an image density. Accordingly, each signal portion of the digital data signal includes data representative of the location and image density of the corresponding pixel.

The digital data signal output by the scanner 110 is then stored in the memory 112. The memory 12 may comprise a RAM, a flash memory, a disk memory or the like. Regardless of the type of memory 112, the digital data signal is stored in the memory 112 in response to the location and image density data within each signal portion. Of course, it is understood that the digital data signal can be directly input to the general purpose digital computer 114, rather than into the intermediate memory 112. Alternately, the memory 112 can be incorporated into the general purpose digital computer 114. In any case, it is understood that the memory 112 is used to provide long-term storage of the image 102.

Once the operator has completed inputting documents into the scanner 110 or the system otherwise determines that the digital data signal representative of the image 102 should be converted to text data, the digital data signal representative of the image 102 is output from the memory 112 to the general purpose computer 114. It is of course understood that a special purpose digital computer or hardwired logic circuit can be used in place of the general purpose digital computer 114.

The digital image data signal stored in the memory 112 is output to the general purpose computer 114, where it is input through the input/output means 24 to an image memory 26. In a first preferred embodiment of the present invention, the gross script-type of the text portion 104 is assumed to be a European script-type. Of course, it is understood that, in a second preferred embodiment of the present invention, if the gross-script type of the text portion 104 is not known to be a European script-type, the present invention can be combined with the method and apparatus for determining the gross script-type described in U.S. application Ser. No. 08/047,515, filed Apr. 19, 1993, assigned to the same assignee as the present invention and incorporated herein by reference.

Once the digital data signal has been completely stored in the image memory 26, the digital data signal is then made available to the connected component generating means 28. The connected component generating means 28 divides the digital data signal representative of the image 102 into a plurality of connected components, each connected component comprising one or more signal portions. Each connected component comprises signal portions corresponding to those pixels of the original image 102 which have a certain minimum image density and form a continuous path. Each script character generally corresponds to one connected component, as in the "F" of "Fuji" or more than one connected component, as in the "j" or "i" in "Fuji".

Once the connected component generating means 28 generates the plurality of connected components for the image 102 from the digital data signal, the digital data signal corresponding to the image 102 and the list of connected components generated by the connected component generating means 28 is stored to the image memory 26 and output to the spatial feature determining means 30.

The spatial feature determining means 30 determines the spatial features of the text portion, such as line positions, word spacing, and character cells. Each character cell includes the vertically aligned connected components within a line between adjacent spaces. For example, the characters "i" and "j" of "Fuji" are each two independent connected components. The spatial feature determining means 30 groups all vertically aligned connected components of one line into one character cell. One method and apparatus for determining spatial features of the text portion 104 from a list of connected components of the text portion 104 is described in U.S. application Ser. No. 08/047,314, filed Apr. 19, 1993, assigned to the same assignee as the present application and incorporated herein by reference.

The list of connected components and character cells is then output by the spatial feature determining means 30 to a character-type classifying means 32. The character-type classifying means 32 converts the connected component or components within a character cell to one of a plurality of abstract character codes based on the number and locations of the connected components within a character cell. The preferred list of character codes, and the characters corresponding to each code, are shown in FIG. 5. As shown in FIG. 5, in the preferred embodiment 13 different abstract character codes are used. Each abstract character code represents one or more characters, based on the number of independent connected components in the character cell, the relative locations between the independent connected components of each character cell, and the location of the connected components within the character cell.

Figure 8:
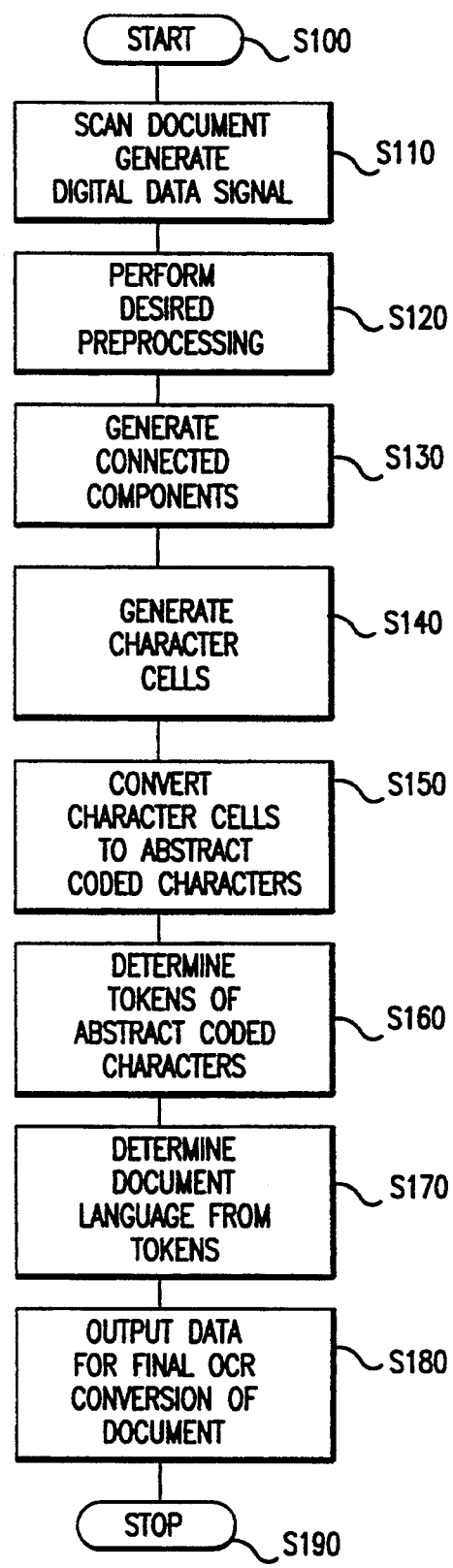
FIG. 8 shows a flow chart of the European character-type classification method of the present invention.

A simplified flowchart of the operation of the script determining system set forth above is shown in FIG. 8. In step S100, the system starts, and the document is scanned in step S110 to generate the digital data signal. The digital image data signal is then cleaned-up by applying any desired preprocessing algorithms to the digital image data signal in step S120. In step S130, the connected components of the digital image data signal are identified and in step S140, the character cells are determined. In step S150, the character-type classification of each character cell is determined. In step S160, the character codes are grouped together to form tokens based on the interword and intraword spacing. In step S170 the tokens are used to determine the particular language of the text portion 104. In step S180, one or more of the determined language, the list of character cells, the list of connected components and the list of coded character are output to the OCR system for final conversion of the text portion 104 of the image 102 of the document 100 to a text document.

Figure 6:
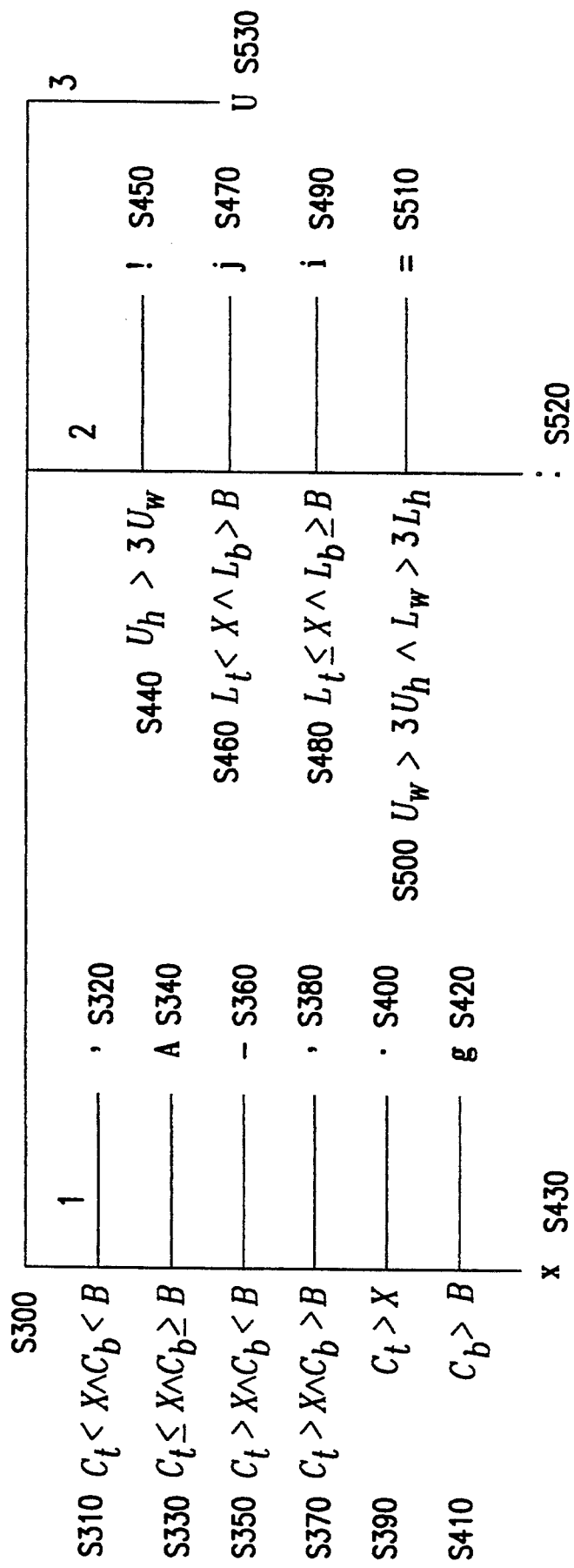
FIG. 6 shows a character-type classification decision tree.
Figure 7:
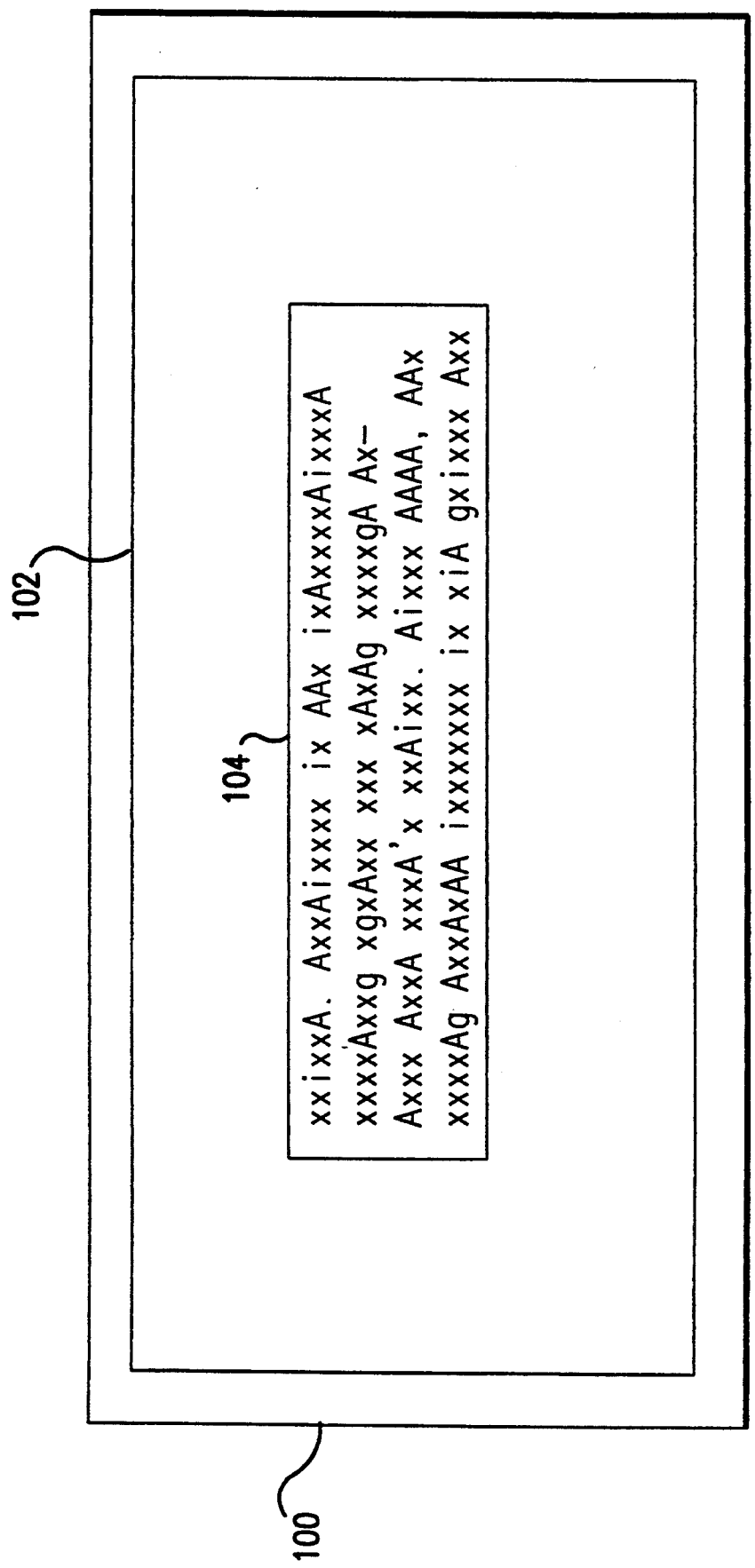
FIG. 7 shows the text portion of FIG. 2 converted to the character classification of FIG. 5.

The decision tree implementing the coding shown in FIG. 5 is shown in FIG. 6. As shown in FIG. 6, there are 7 abstract character codes for character cells having a single connected component, 5 abstract character codes for character cells having two connected components, and one abstract character code for character cells having three connected components.

The preferred embodiment of the method of the present invention implements the decision tree shown in FIG. 6. In step S300, the classification means 32 first determines the number of connected components within the current character cell. In the preferred embodiment of the present invention, the character-type classification means 32 operates on each character cell of the text portion 104 on a cell-by-cell basis.

If the classification means 32 determines in step S300 that the character cell has only one connected component, the classification means 32 next determines, in step S310, whether the top position of the connected component is above the x-line position of the current line and the bottom position is above the baseline. It is understood that the line positions and the connected component locations are measured from a reference position at or near the uppermost position and at or near the leftmost position, such that the positions are positive down and positive right.

Because the method and apparatus of the present invention are statistically based, they are very robust and can withstand even a very poorly printed and/or scanned document. That is, it is not necessary for the digital data signal or the connected components generated from the digital data signal to perfectly represent every character of the document. Rather, the present invention is able to withstand such common scanning errors such as splitting a single connected component character into two or more connected components, merging two or more separate connected components into a single connected component or misplacing the connected components on the line.

If step S310 is positive, then the classification means 32 converts the character cell in step S320 to an apostrophe. However, if step S310 is negative, the classifying means 32 continues on to step S330. In step S330, the classification means 32 determines if the top position of the connected component is above the x-line position, while the bottom of the character is at or below the baseline position. If step S330 is positive, then the classification means 32 converts the character cell in step S340 to an "A". The "A" represents all capital letters, all numbers, the lowercase letters having ascenders, and all of the generally vertically oriented punctuation marks, as shown in FIG. 5.

If step S330 is negative, the classifying means 32 continues to step S350. In step S350, the classifying means 32 determines if the top of the connected component is below the x-line position, which the bottom of the connected component is above the baseline position. If step S350 is positive, then the classification means 32 converts the character cell to a "—" in step S360.

If step S360 is negative, the classification means 32 continues to step S370. In step S370, the classification means 32 determines if the top position of the connected component is below the x-line position, and the bottom position of the connected component is below the baseline position. If step S370 is positive, the classification means 32 converts the character cell to a comma in step S380. If step S370 is negative, the classification means 32 continues to step S390. In step S390, the classification means 32 determines if the top position of the connected component is below the x-line position. If step S390 is positive, the classification means 32 converts the character cell to a period in step S400.

If step S390 is negative, the classification means 32 continues to step S410. In step S410, the classification means 32 determines if the bottom position of the connected component is below the baseline position. If step S410 is positive, the classification means 32 converts the character cell to a "g" in step S420. The "g" code represents any lower case letter having a descender, as shown in FIG. 5.

If step S410 is negative, the classification means 32 continues to step 5430. In step S430, the classification means 32 assumes the connected component is a lower case letter which does not have either an ascender or descender, and converts the connected component to an "x". Then, following step S430, or steps S320, S340, S360, S380, S400 and S420, the classification means 32 selects the next character cell is selected as the current character cell and then returns to step S300.

However, if in step S300 the classification means 32 determines that there are two connected components in the current character cell, the classification means 32 continues to step S440. In step S440, the classification means 32 determines if the height of the upper connected component is greater than 3 times the width of the upper connected component. The height of a connected component is simply the difference between its top position and its bottom position, while the width of a connected component is the difference between its rightmost position and its leftmost position. If step S440 is positive, the classification means 32 continues to step S450. In step S450, the classification means 32 converts the character cell to an "!".

If step S440 is negative, the classification means 32 continues to step S460. In step S460, the classification means 32 determines if the top position of the upper connected component is above the x-line position, and the bottom position of the lower connected component is below the baseline position. If step S460 is positive, the classification means 32 converts the character cell to an "j" in step S470. The "j" represents any lower case letter having a separate connected component extending above the x-line, and a separate connected component extending below the baseline.

If step S460 is negative, the classification means 32 continues to step S480. In step S480, the classification means 32 determines if the top portion of the upper connected component is above the x-line position and the bottom portion is not below the baseline position. If step S480 is positive, the classification means 32 converts the character cell to an "i" in step S490. The "i" represents any lower case letter having a separate connected component which extends above the x-line position and a separate connected component which does not extend below the baseline position, as shown in FIG. 5.

If step S480 is negative, the classification means 32 continues to step S500. In step S500, the classification means 32 determines if both the upper and lower connected components are three times as wide as they are high. If step S500 is positive, the classification means 32 converts the character cell to a "=" in step S510. If step S500 is negative, the classification means 32 assumes the character cell is to be converted to an ":", and in step S520, the character cell is so converted. After step S520, and steps S450, S470, S490 and S510, the classification means 32 selects the next character cells as the current character cell, and continues to step S300.

However, if the classification means 32 determines in step S300, that there are three connected components in the current character cell, the classification means 32 continues to step S530. In step S530, the classification means 32 assumes that the character cell represents an upper or lower case letter which has an umlaut, and therefore converts the character cell to a "Ü", as shown in FIG. 5. The classification means 32 then selects a next character cell as the current character cell and continues to step S300. However, if there isn't a next character cell, the classification means 32 stops classifying the text portion 104, and outputs the list of abstract character codes in place of the character cells to the image memory 26.

The list of word tokens of one or more coded characters is provided to a European language determining means 34, which inputs the list of word tokens and determines the particular European language of the text portion 104. Such a European language determination means is described in U.S. patent application Ser. No. 08/047,589, filed Apr. 19, 1993, assigned to the same assignee as the present application and incorporated herein by reference.

While the invention has been described with reference to particular preferred embodiments, the invention is not limited to the specific examples given, and other embodiments and modifications can be made by those skilled in the art without the departing from spirit and scope of the invention and claims.

What is claimed is:

1. An automatic character classifying system for generating a plurality of abstract coded characters from original characters contained in a text portion of an image of a document, each one of the plurality of abstract coded characters representing one of a plurality of abstract coded character classes, the classifying system comprising:

input means for inputting a digital data signal representative of the text portion, the digital data signal comprising a plurality of signal portions, each signal portion corresponding to one of a plurality of pixels;

connected component generating means for generating a plurality of connected components from the plurality of signal portions, each one of the original characters of the text represented by at least one of the plurality of connected components;

character cell generating means for generating a plurality of character cells from the plurality of signal portions, each character cell comprising at least one connected component;

spatial feature determining means for determining spatial features of the plurality of character cells based on at least one of a number and locations of the at least one connected component comprising each character cell; and classifying means for classifying each of the plurality of character cells into one of the plurality of abstract coded character classes based on the spatial features determined by the spatial feature determining means and converting each character cell into the corresponding abstract coded character based on the classification.

2. The automatic character classifying system of claim 1, wherein the classifying means converts the character cells based on at least one of the number of connected components in the character cell, the horizontal extent of at least one connected component in the character cell, the vertical extent of at least one connected component in the character cell, the top position of at least one connected component in the character cell, and the bottom position of at least one connected component in the character cell.

3. The automatic character classifying system of claim 1, wherein the spatial feature determining means comprises:

counting means for determining the number of connected components in a current one of the character cells;

top position locating means for locating a top position of at least one connected component in the character cell;

bottom position locating means for locating a bottom position of at least one connected component in the character cell;

connected component sizing means for determining at least one of a height and a width of at least one connected component in the character cell; and spatial feature storing means for storing at least one of the determined spatial features of a current line of said original characters contained in the text portion corresponding to the current character cell; and wherein the classifying means comprises comparing means for comparing at least one of the top position and the bottom position of at least one connected component with the stored spatial features and for comparing connected component height to connected component width.

4. The automatic character classifying system of claim 3, wherein the stored spatial features comprise at least one of a baseline position for the current line and an x-line position of the current line.

5. The automatic character classifying system of claim 1, wherein the at least one determined spatial feature comprise at least one of interword spaces and intraword spaces.

6. A method for automatically generating a plurality of abstract coded characters from original characters contained in a text portion of an image of a document, each one of the plurality of abstract coded characters representing one of a plurality of abstract coded character classes, the method comprising the steps of:

inputting a digital data signal representative of the text portion, the digital data signal comprising a plurality of signal portions, each signal portion corresponding to one of the plurality of pixels;

generating a plurality of connected components from the plurality of signal portions, each one of the original characters of the text represented by at least one of the plurality of connected components;

determining spatial features of the text portion;

generating a plurality of character cells from the plurality of signal portions, each character cell comprising at least one connected component;

classifying each of the plurality of character cells into one of the plurality of abstract coded character classes based on the determined spatial features; and converting each of the plurality of character cells into one of the plurality of abstract coded characters based on the classification.

7. The method for automatically generating a plurality of abstract coded characters of claim 6, wherein the classifying step classifies the character cells into one of the plurality of abstract coded character classes based on at least one of the number of connected components in the character cell, the horizontal extent of at least one connected component in the character cell, the vertical extent of at least one connected component in the character cell, the top position of at least one connected component in the character cell, and the bottom position of at least one connected component in the character cell.

8. The method for automatically generating a plurality of abstract coded characters of claim 6, wherein the classifying step comprises at least one of the steps of:

determining a number of connected components in a current one of the character cells;

locating a top position of at least one connected component in the character cell;

locating a bottom position of at least one connected component in the character cell;

determining at least one of a height and a width of at least one connected component in the character cell;

comparing at least one of the top position and the bottom position of at least one connected component with the determined spatial features; and comparing connected component height to connected component width.

9. The method for automatically generating a plurality of abstract coded characters of claim 8, wherein the determined spatial features comprise at least one of a baseline position for the current line and an x-line position of the current line.

10. The method for automatically generating a plurality of abstract coded characters of claim 6, wherein the at least one determined spatial feature comprise at least one of interword spaces and intraword spaces.

11. A method for automatically converting a character cell of a text portion of an image of a document into one of a plurality of abstract coded characters, each one of the plurality of abstract coded characters representing one of a plurality of abstract coded character classes, the method comprising the steps of:

determining spatial features of the character cell;

determining a number of connected components in the character cell, the character cell containing at least one connected component, the at least one connected component representing an original character of the text portion;

locating a top position of at least one connected component in the character cell;

locating a bottom position of at least one connected component in the character cell;

comparing at least one of the top position and the bottom position of at least one connected component with the determined spatial features;

classifying the character cell into one of the plurality of abstract coded character classes based on the determined number of connected components and the located top and bottom positions; and converting the character cell to one of the plurality of abstract coded characters based on the classification.

12. The method for automatically converting a character cell of claim 11, further comprising the steps of:

determining at least one of a height and a width of at least one connected component in the character cell; and comparing connected component height to connected component width.

* * * * *